(12) United States Patent
Tazbaz (10) Patent No.: US 10,146,268 B2
(45) Date of Patent: Dec. 4, 2018

(54) HINGE APPARATUS, SYSTEMS, AND METHODS

(71) Applicant: Microsoft Technology Licensing, LLC, Redmond, WA (US)

(72) Inventor: Errol Mark Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/234,698

(22) Filed: Aug. 11, 2016

(65) Prior Publication Data

US 2018/0046227 A1    Feb. 15, 2018

(51) Int. Cl.
| | |
|---|---|
| *G06F 1/16* | (2006.01) |
| *E05D 3/06* | (2006.01) |
| *E05D 15/00* | (2006.01) |
| *H04M 1/00* | (2006.01) |
| *E05D 11/00* | (2006.01) |
| *E05D 11/08* | (2006.01) |

(52) U.S. Cl.
CPC .............. *G06F 1/1681* (2013.01); *E05D 3/06* (2013.01); *E05D 11/0081* (2013.01); *E05D 11/082* (2013.01); *G06F 1/1618* (2013.01); *G06F 1/1637* (2013.01); *E05Y 2900/606* (2013.01); *G06F 1/1615* (2013.01); *G06F 1/1683* (2013.01)

(58) Field of Classification Search
CPC .... G06F 1/1681; G06F 1/1618; G06F 1/1615; G06F 1/1616; E05D 3/06
USPC ............. 361/679.26–679.28, 679.55–679.59; 16/221–392; 455/575.1, 575.3, 575.8
See application file for complete search history.

(56) References Cited

U.S. PATENT DOCUMENTS

| | | |
|---|---|---|
| 5,666,694 A | 9/1997 | Slow et al. |
| 6,845,005 B2 | 1/2005 | Shimano et al. |
| 8,032,988 B2 | 10/2011 | Lai et al. |
| 8,687,354 B2 | 4/2014 | Uchiyama et al. |
| 8,713,759 B2 | 5/2014 | Cai |

(Continued)

FOREIGN PATENT DOCUMENTS

| | | |
|---|---|---|
| EP | 1182316 A1 | 2/2002 |
| WO | 2012110900 A2 | 8/2012 |

OTHER PUBLICATIONS

Wang, Harry, "The 360 Degrees (and 25,000 Hinge Tests) of Yoga Design", Published on: Dec. 5, 2012 Available at: http://blog.lenovo.com/en/blog/the-360-degrees-of-yoga-design.

(Continued)

*Primary Examiner* — Nidhi Thaker
(74) *Attorney, Agent, or Firm* — Ray Quinney & Nebeker; Paul N. Taylor; Qudus Olaniran (57) ABSTRACT

A hinge is disclosed. The hinge includes a first portion and a second portion. The hinge includes a first link having a first pivot and a second pivot. The first pivot is connected to the first portion. The first link is biased about the first pivot of the first link toward a first position. The hinge includes a second link having a first pivot and a second pivot. The first pivot connected to the second portion. The second pivot of the second link connected to the second pivot of the first link. The second link biased about the first pivot of the second link toward the first position. The second pivot of the first link and the second pivot of the second link defining a hinge pivot. Methods of transitioning a computing device are disclosed.

18 Claims, 10 Drawing Sheets

(56) References Cited

U.S. PATENT DOCUMENTS

| | | |
|---|---|---|
| 8,787,016 B2 | 7/2014 | Rothkopf et al. |
| 2005/0155184 A1 | 7/2005 | Kayl |
| 2009/0227301 A1* | 9/2009 | Lindvall ............... G06F 1/1616 455/575.4 |
| 2011/0099756 A1 | 5/2011 | Chen |
| 2011/0156558 A1* | 6/2011 | Wu ....................... G06F 1/1616 312/309 |
| 2011/0205695 A1 | 8/2011 | Hassemer et al. |
| 2011/0312392 A1* | 12/2011 | Reeves ............... H04M 1/0216 455/575.3 |
| 2012/0120618 A1* | 5/2012 | Bohn .................... G06F 1/1681 361/749 |
| 2012/0257368 A1* | 10/2012 | Bohn .................... H04M 1/022 361/809 |
| 2013/0219663 A1 | 8/2013 | Cai |
| 2014/0196254 A1 | 7/2014 | Song |
| 2015/0185788 A1 | 7/2015 | Matsuoka |
| 2015/0227174 A1 | 8/2015 | Byquist et al. |
| 2015/0277505 A1 | 10/2015 | Lim et al. |
| 2015/0361696 A1 | 12/2015 | Tazbaz |
| 2015/0373863 A1* | 12/2015 | Lin ........................ A45C 11/00 206/774 |
| 2016/0132075 A1 | 5/2016 | Tazbaz |

OTHER PUBLICATIONS

"International Search Report and Written Opinion Issued in PCT Application No. PCT/US2017/045397", dated Oct. 23, 2017, 12 Pages.

\* cited by examiner

HINGE APPARATUS, SYSTEMS, AND METHODS

BACKGROUND

Background and Relevant Art

Use of computing devices is becoming more ubiquitous by the day. Computing devices range from standard desktop computers to wearable computing technology and beyond. Consumer demands indicate a general desire for smaller and lighter computing devices while maximizing the usable space of the computing devices.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In one embodiment, a hinge is disclosed. The hinge includes a first portion and a second portion. The hinge includes a first link having a first pivot and a second pivot. The first pivot is connected to the first portion. The first link is biased about the first pivot of the first link toward a first position. The hinge includes a second link having a first pivot and a second pivot. The first pivot connected to the second portion. The second pivot of the second link connected to the second pivot of the first link. The second link biased about the first pivot of the second link toward the first position. The second pivot of the first link and the second pivot of the second link defining a hinge pivot. Methods of transitioning a computing device are disclosed.

In one embodiment, a computing device is described. The computing device includes first portion having a first inner surface and a first outer surface. The computing device includes a second portion having a second inner surface and a second outer surface. The computing device includes a hinge. The hinge includes a first link having a first pivot and a second pivot. The first pivot is connected to the first portion. The first link is biased about the first pivot of the first link. The hinge includes a second link having a first pivot and a second pivot. The first pivot is connected to the second portion. The second pivot of the second link is connected to the second pivot of the first link. The second link is biased about the first pivot of the second link.

In one embodiment, a method for transitioning a computing device to a flat configuration is described. The method includes moving a first portion of a computing device from a closed configuration, where a first inner surface of the first portion adjacent a second inner surface of a second portion of the computing device, to an open configuration, where the first inner surface of the first portion does not abut the second inner surface of the second portion. The first portion of the computing device is moved to a flat configuration where the first inner surface of the first portion is parallel to the second inner surface of the second portion. The first portion of the computing device is moved to an inverted configuration where a first outer surface of the first portion is adjacent a second outer surface of the second portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-1 is an isometric view of an embodiment of a computing device in a closed configuration;

FIG. 1-2 is an isometric view of the embodiment of a computing device of FIG. 1-1 in an open configuration;

FIG. 1-3 is an isometric view of the embodiment of a computing device of FIG. 1-1 in a flat configuration;

FIG. 1-4 is an isometric view of the embodiment of a computing device of FIG. 1-1 in an inverted configuration;

FIG. 2-1 is a side view of the embodiment of a computing device of FIG. 1-1 in a in a closed configuration;

FIG. 2-2 is a side view of the embodiment of a computing device of FIG. 1-1 in an open configuration;

FIG. 2-3 is a side view of the embodiment of a computing device of FIG. 1-1 in a flat configuration;

FIG. 2-4 is a side view of the embodiment of a computing device of FIG. 1-1 in an inverted configuration;

FIG. 3-1 is a side view of the embodiment of a hinge of FIG. 1-1 in a closed configuration;

FIG. 3-2 is a side view of the embodiment of a hinge of FIG. 1-1 in an open configuration;

FIG. 3-3 is a side view of the embodiment of a hinge of FIG. 1-1 in a flat configuration;

FIG. 3-4 is a side view of the embodiment of a hinge of FIG. 1-1 in an inverted configuration;

DETAILED DESCRIPTION

This disclosure generally relates to devices, systems, and methods for moveably connecting a plurality of components together. More particularly, this disclosure generally relates to computing devices with two portions that may be connected together to move about a desired path and methods of use. One or more embodiments described herein may be capable of connecting two portions of a computing device together to rotate about a moveable pivot (e.g., hinge) axis.

FIG. 1-1 is an isometric view of an embodiment of a computing device 100 in a closed configuration, FIG. 1-2 is an isometric view of the embodiment of a computing device 100 of FIG. 1-1 in an open configuration, FIG. 1-3 is an isometric view of the embodiment of a computing device 100 of FIG. 1-1 in a flat configuration, and FIG. 1-4 is an isometric view of the embodiment of a computing device 100 of FIG. 1-1 in an inverted configuration.

Referring generally to the computing device 100 shown in FIGS. 1-1 through 1-4, the computing device 100 may include a first portion 102 and a second portion 104. The first portion 102 is connected to the second portion 104 by a hinge 120. The hinge 120 may be covered, as shown in FIGS. 1-1 through 1-4. Further details about the hinge 120 will be provided below.

Figure 13:
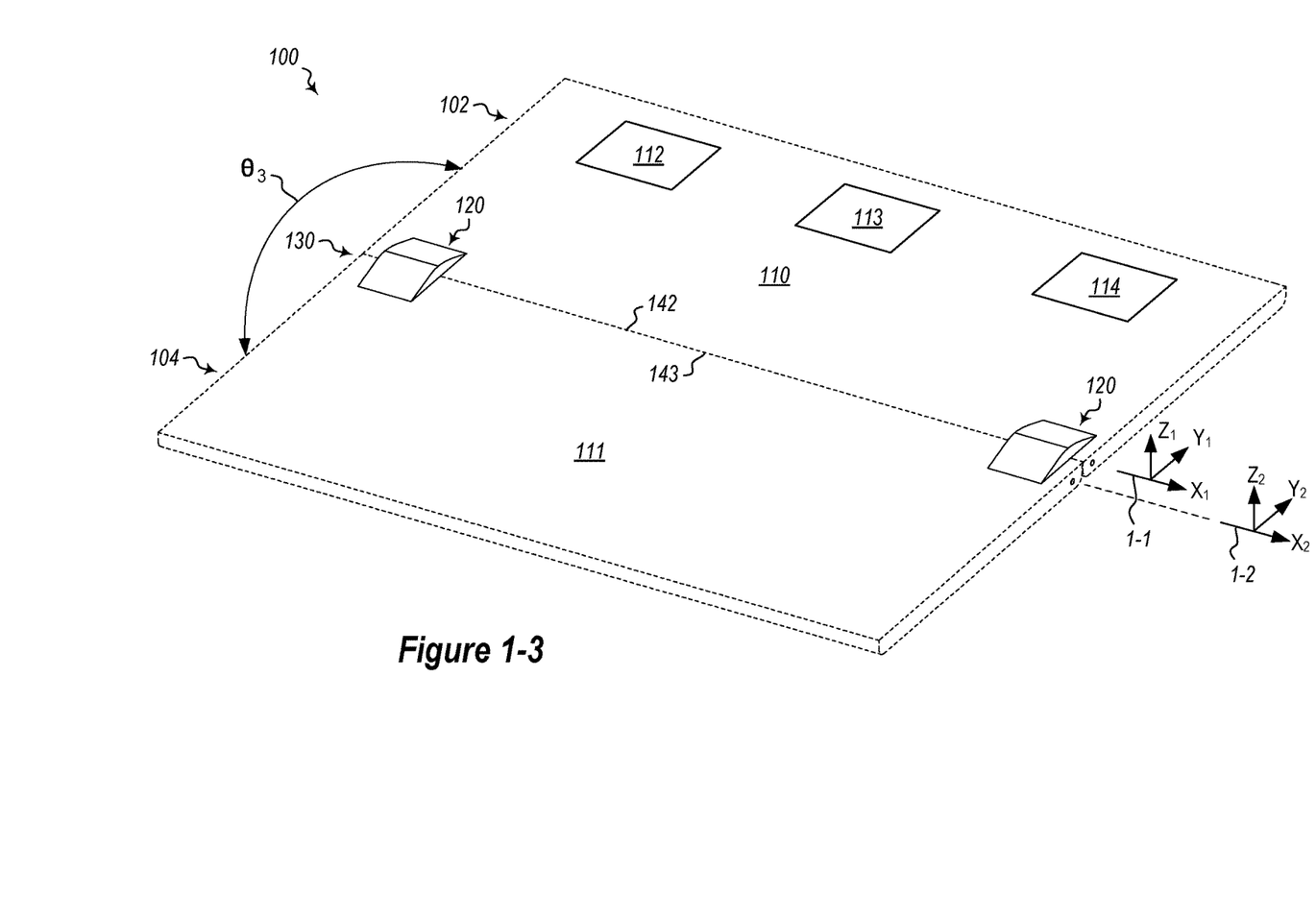

By way of orientation, a first coordinate system 1-1 (including the $x_1$-direction, the $y_1$-direction, and the $z_1$-direction) is provided for the first portion 102 and a second coordinate system 1-2 (including the $x_2$-direction, the $y_2$-direction, and the $z_2$-direction) is provided for the second portion 104. In the illustrated configuration, these coordinate systems 1-1 and 1-2 are oriented relative to their respective x-axes. When the angle (e.g., $\theta_3$ shown in FIG. 1-3) between the first portion 102 and the second portion 104 is one-hundred and eighty degrees, the $x_1$ and $x_2$ axes, the $y_1$ and the $y_2$ axes, and the $z_1$ and the $z_2$ axes are parallel. When the angle (e.g., $\theta_2$) between the first portion 102 and the second portion 104 is ninety degrees, the $x_1$ and $x_2$ axes are parallel, the $y_1$ and the $z_2$ axes are parallel, and the $z_1$ and the $y_2$ axes are parallel but opposite (e.g., positive values extending in opposite directions). For ease of description, front is the positive z-direction, back is the negative z-direction, top is the positive y-direction, bottom is the negative y-direction, right is the positive x-direction, and left is the negative x-direction. Although not shown in the remaining figures, similar orientation will be used for ease of description.

The first portion 102 may include a display 110. The display 110 may be a touch sensitive display screen and thus may act as an input. The second portion 104 may include an input device 111. The input device 111 may include a keyboard, touchpad, one or more buttons, other input devices, or combinations thereof that may be used to provide input to the processor 112. For example, the first portion 102 and the second portion 104 may both include displays 110 that are touch sensitive.

Although a hybrid computing device is shown, the present invention may be used with other computing devices where two portions are rotatably connected together. For example, the first portion 102 may be a mobile phone and the second portion 104 may be a cover, a keyboard, or another device. In other embodiments, the hinges described herein may be used in a non-computing (e.g., purely mechanical) environment.

The first portion 102 and/or the second portion 104 may include a processor 112, memory 113, a battery 114, other computing components, or combinations thereof. For example, as shown, the first portion 102 may include a processor 112, memory 113, and a battery 114 while the second portion 104 may also include a processor (e.g., processor 112, not shown). In some embodiments, only one of the first portion 102 or the second portion 104 may include a processor 112. In other embodiments, both of the first portion 102 and the second portion 104 include a processor 112. In further embodiments, one or more computing components (e.g., processors 112, memory 113, and battery 114) may be included in the first portion 102 and/or the second portion 104 in any combination.

Figure 5:
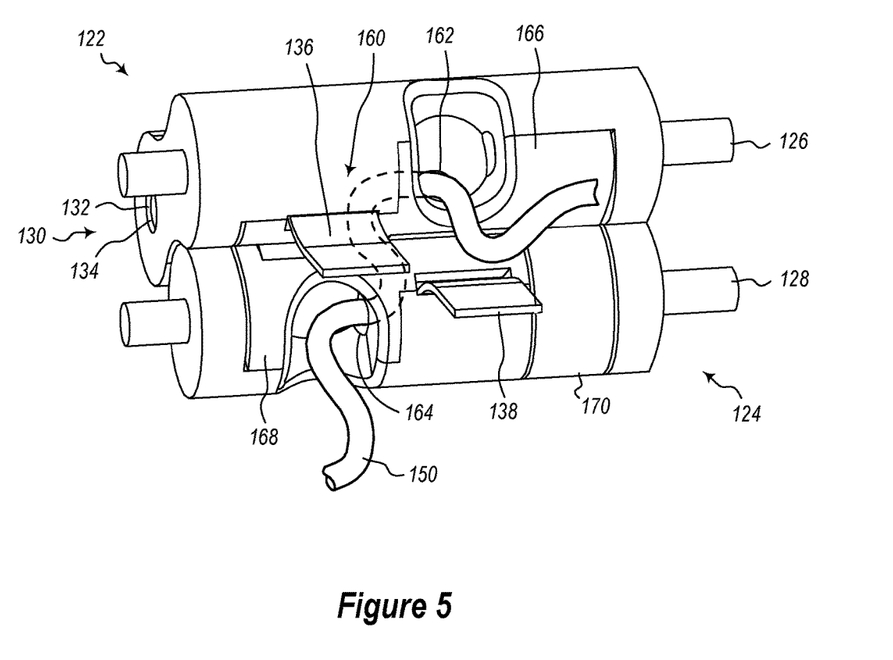
FIG. 5 is an isometric view of the embodiment of a hinge of FIG. 1-1 showing a wire in a wire guide.

The computing components in the second portion 104 may be in electronic communication with one or more of the computing components in the first portion 102. For example, as shown in FIG. 5, the first portion 102 and the second portion 104 may be in electronic communication via a physical electrical connector.

As shown in FIGS. 1-1 through 1-4, the computing device 100 may include a pair of hinges. In other embodiments, the computing device 100 may include more or fewer hinges. For example, the computing device 100 may include a single centrally located hinge.

Figure 11:
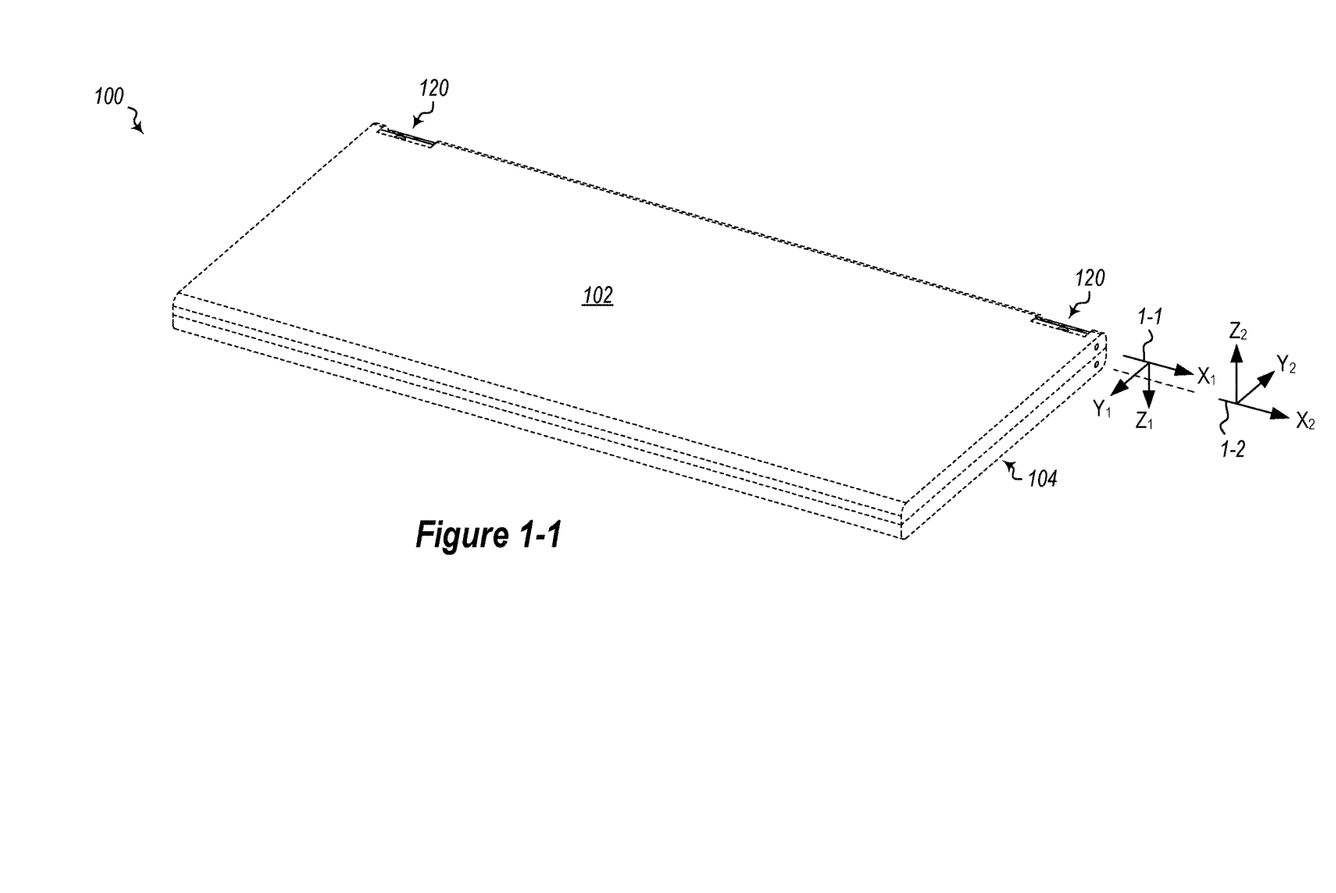
Figure 12:
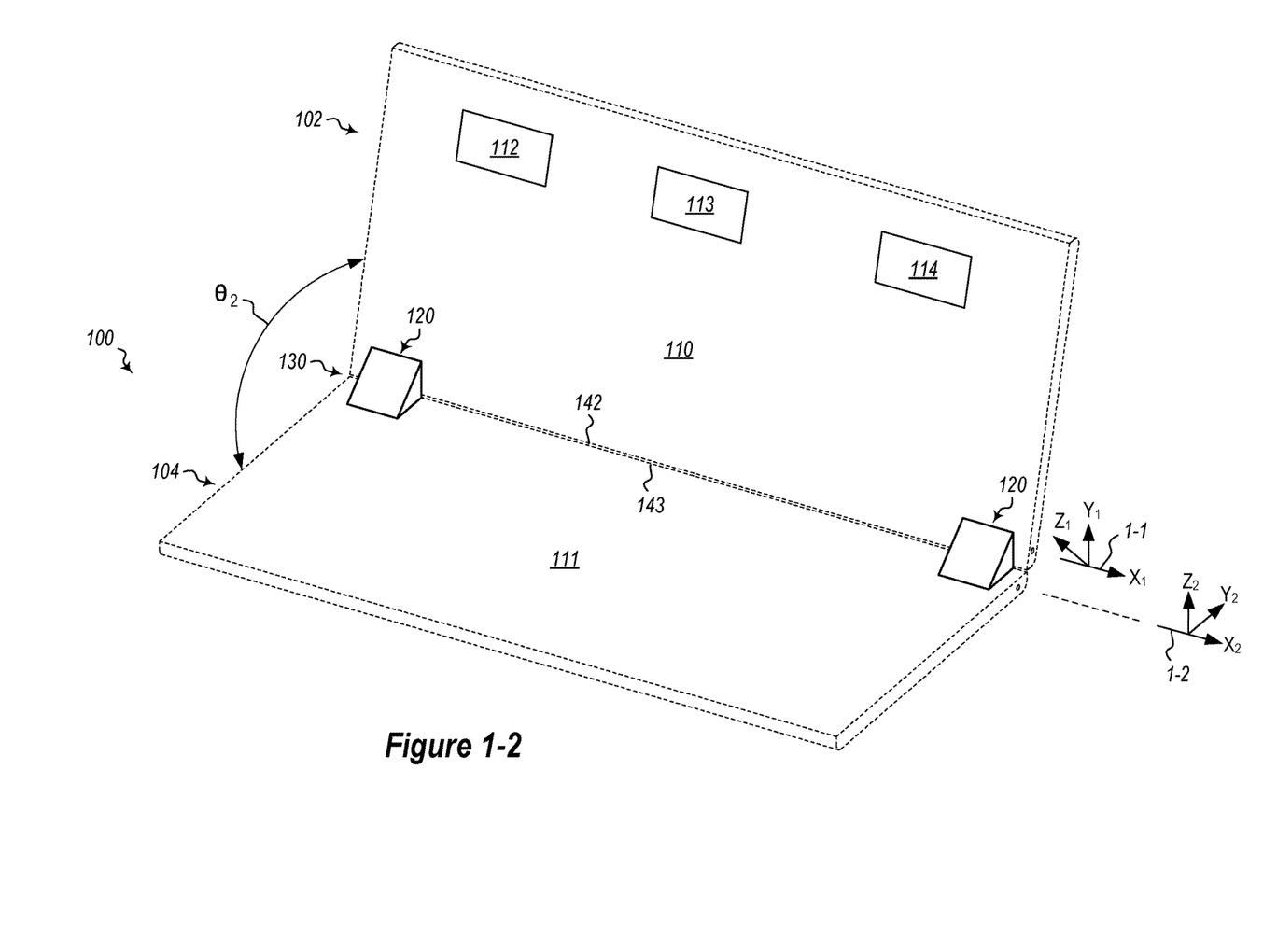

The first portion 102 may include an inner surface (e.g., front surface) that may face an inner surface (e.g., front surface) of the second portion 104 in the closed configuration of FIG. 1-1. As shown in FIG. 1-1, the inner surfaces may abut in the closed configuration. As best seen in FIGS. 1-1 and 1-2, the inner surfaces of the first portion 102 and the second portion 104 may each respectively include an edge 142, 143.

As shown in FIG. 1-2, the two edges 142, 143 may be spaced apart. Spacing apart the two edges 142, 143 may be desirable in at least one embodiment. For example, in embodiments where one or more inner surfaces of the first portion 102 and/or second portion 104 include a cover glass (e.g., cover glasses 140, 141 shown in FIGS. 2-1 through 2-4), were the edges 142, 143 to contact as the computing device 100 transitions from the closed configuration of FIG. 1-1 toward the flat configuration of FIG. 1-3, the one or more inner surfaces may be damaged. In other embodiments, the cover glasses 140, 141 may extend to one or more edges of the first and/or second portion 102, 104.

Figures 22, 32:
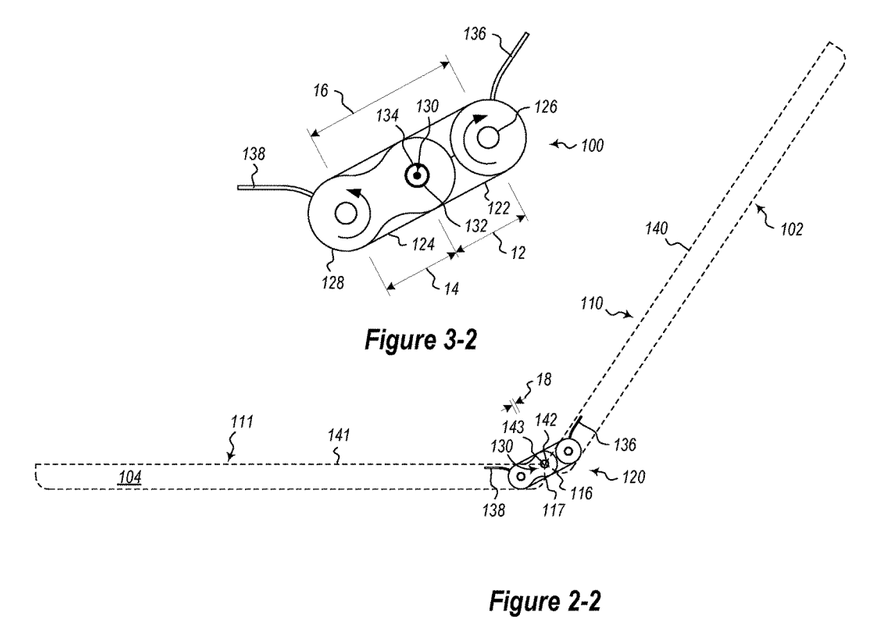
Figure 23:
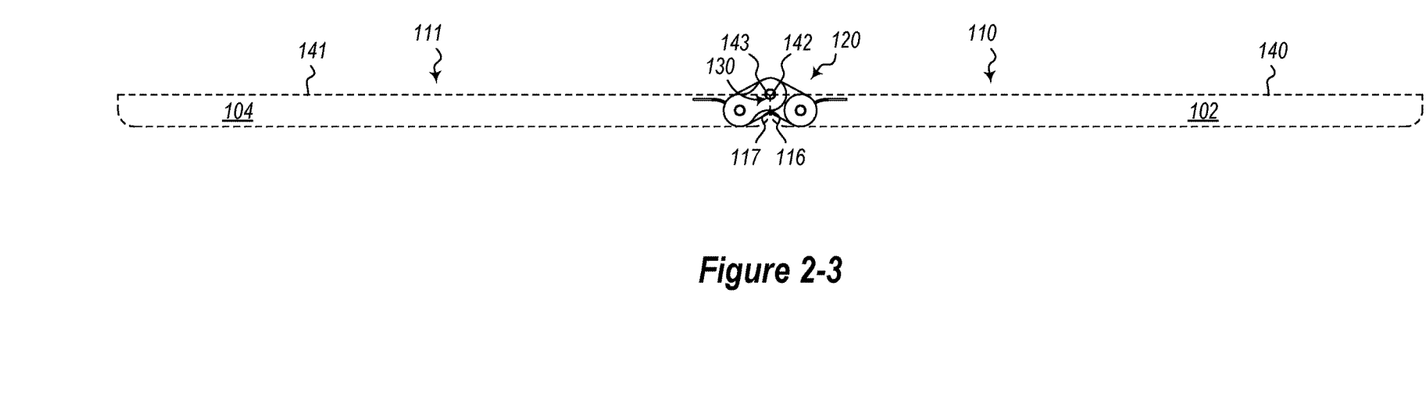

As shown in FIG. 1-3, the edges 142, 143 may be adjacent and/or abutting in the flat configuration. At least one embodiment of a hinge and/or computing device described herein may be capable of abutting the edges 142, 143 in the flat configuration while maintaining a gap (e.g., gap 18 shown in FIG. 2-2) in the open configuration. In other words, at least one embodiment described herein may be capable of protecting the edges 142, 143 as the hinges 120 move from the closed configuration to the flat configuration.

The hinge 120 may include a hinge pivot 130. The first portion 102 and/or the second portion 104 may rotate about the hinge pivot 130 as the computing device 100 transitions (e.g., from a first configuration (e.g., closed, open, flat, or inverted) to a second configuration (e.g., closed, open, flat, or inverted) and/or back to the first configuration). The angle between the inner surface of the first portion 102 and the inner surface of the second portion 104 (e.g., $\theta_2$, $\theta_3$, $\theta_4$) may be measured through the hinge pivot 130. Further examples of transitioning about the hinge pivot 130 will be provided below.

Figure 14:
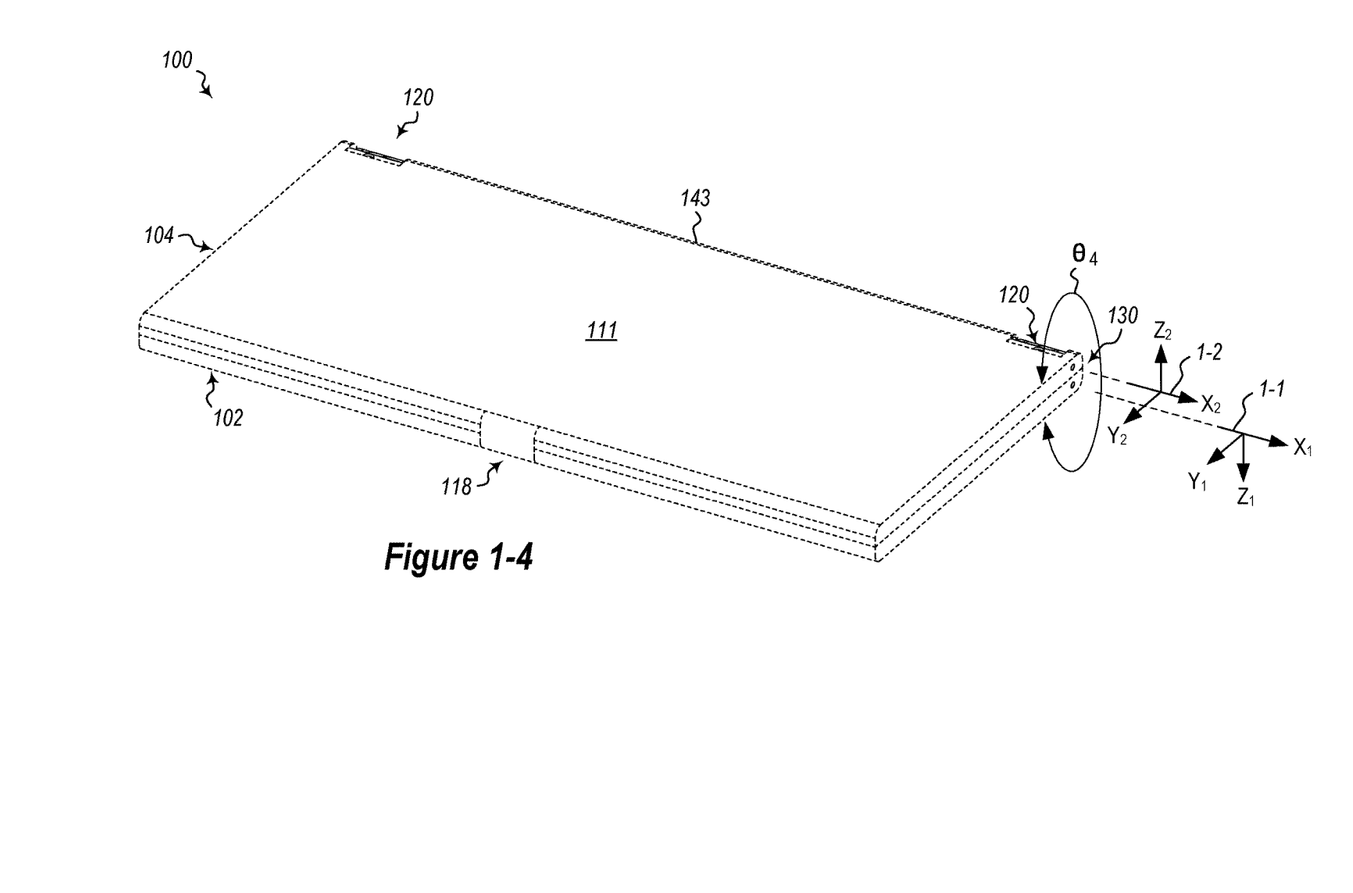

The hinge 120 may be biased toward the closed configuration, as will be described below. As shown in FIG. 1-4, the computing device 100 may include a latch 118. The latch 118 may be used to secure the first portion 102 and the second portion 104 from transitioning back toward the closed configuration (e.g., due to biasing in the hinge 120). Although a latch 118 is shown, other devices may be used to limit the rotation of the first portion 102 and/or the second portion 104.

Similar to FIGS. 1-1 through 1-4, FIGS. 2-1 through 2-4 show the embodiment of a computing device 100 of FIG. 1-1 in the closed configuration, the open configuration, the flat configuration, and the inverted configuration, respectively, but from a side view. Likewise, FIGS. 3-1 through 3-4 show an embodiment of a hinge 120 in the closed configuration, the open configuration, the flat configuration, and the inverted configuration, respectively, but also from a side view.

Referring to FIGS. 2-1 through 2-4, the computing device 100 is shown with an embodiment of a hinge 120. Although FIGS. 2-1 through 2-4 and 3-1 through 3-4 show one embodiment of a hinge 120, in other embodiments other hinges may be used.

The first portion 102 and/or second portion 104 of the computing device 100 may include an inner surface. As shown in FIGS. 2-1 through 2-4, the computing device 100 may include a cover glass 140 on the inner surface of the first portion 102 and/or a cover glass 141 on the inner surface of the second portion 104.

Figure 21:
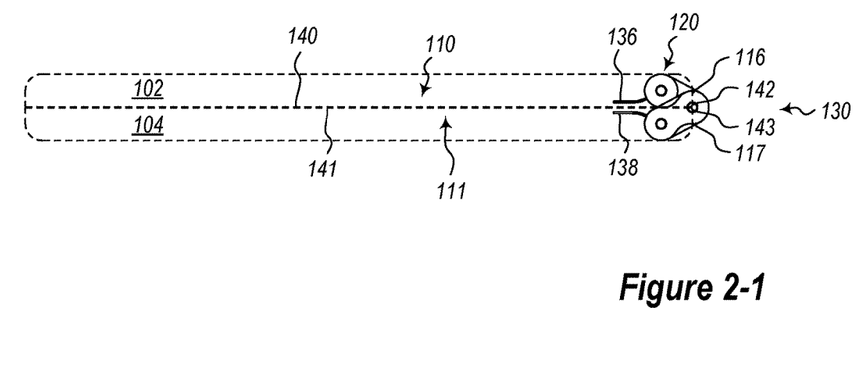

The cover glasses 140, 141 may each include an edge 142, 143, respectively. One or more of the edges 142, 143 may extend to an outer surface 116, 117 of the first portion 102 and/or second portion 104. As shown in FIG. 2-1 both edges 142, 143 extend to the topmost (e.g., in the y-direction) outer surfaces 116, 117 of the first portion 102 and the second portion 104.

The inner surfaces and/or cover glasses 140, 141 and/or the edges 142, 143 may abut in the closed configuration. In other embodiments, the inner surfaces and/or cover glasses 140, 141 and/or the edges 142, 143 may be spaced apart but adjacent (e.g., no intervening components) in the closed configuration.

The hinge 120 may be configured to facilitate the closed configuration (e.g., adjacent and/or abutting surfaces and/or edges). For example, the hinge 120 may be biased toward the closed configuration. As shown, the hinge 120 may include a first spring 136 and a second spring 138.

As shown in FIGS. 3-1 through 3-4, the hinge 120 may include a first link 122 and a second link 124. The first link 122 may include a first pivot 126 and a second pivot 132 and the second link 124 may include a first pivot 128 and a second pivot 134. The first link 122 and/or the second link 124 may bias the hinge toward the closed configuration. For example, as shown, the first link 122 is biased in a clockwise direction about the first pivot 126 and the second link 124 is biased in a counterclockwise direction about the first pivot 128. The biasing may be accomplished by the first spring 136 and/or the second spring 138. As shown in FIGS. 2-1 through 3-4, the first spring 136 and second spring 138 are torsion springs the tail of which may abut the first portion 102 and the second portion 104, respectively to provide the biasing force about the first pivots 126, 128. In other embodiments other biasing elements may be used. For example, leaf springs, a cam and follower, other biasing elements, or combinations thereof, may be used to bias the hinge 120.

The first pivot 126 and the second pivot 132 of the first link 122 may be spaced apart by a first distance 12, the first pivot 128 and the second pivot 134 of the second link 124 may be spaced apart by a second distance 14, and the first pivot 126 of the first link 122 and the first pivot 128 of the second link 124 may be spaced apart by a third distance 16. As shown in FIGS. 3-1 through 3-4, the first distance 12 and the second distance 14 are the same.

Figure 31:
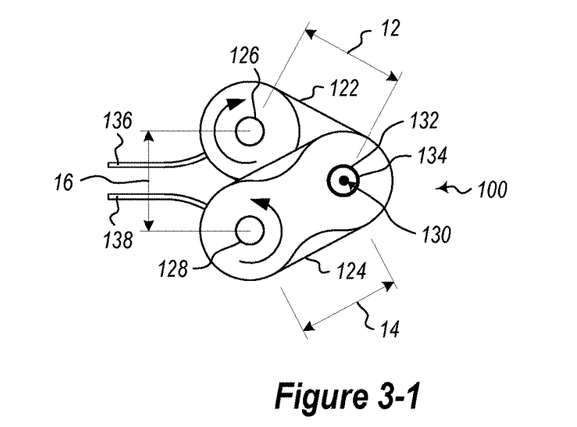
Figure 33:
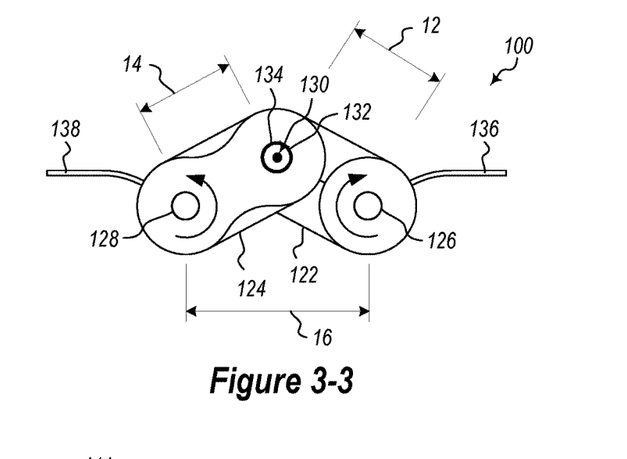
Figure 34:
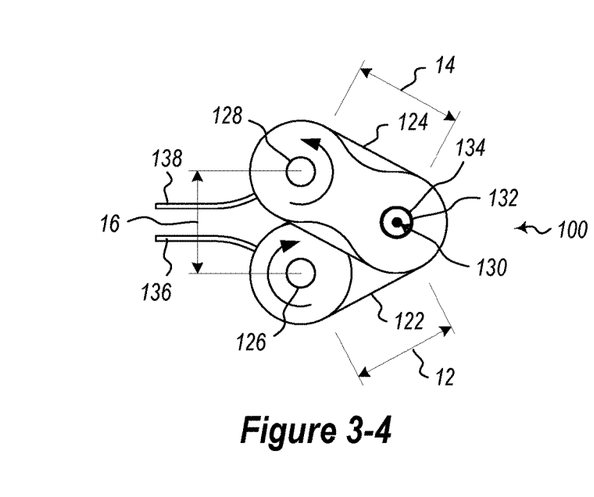

The second pivot 132 of the first link 122 and the second pivot 134 of the second link 124 may be coaxial, as shown. The hinge 120 may include a hinge pivot 130. As shown in FIG. 3-1, the hinge pivot 130 may be coaxial with the second pivot 132 of the first link 122 and the second pivot 134 of the second link 124.

The first link 122 may move about the first pivot 126 and/or the second pivot 132. For example, the first link 122 may rotate about the first pivot 126 in a clockwise and/or counterclockwise direction. The second link 124 may move about the first pivot 128 and/or the second pivot 132. For example, the second link 124 may move about the first pivot 128 in a clockwise and/or counterclockwise direction. The first link 122 and/or the second link 124 may rotate about their respective first pivots 126, 128 and/or second pivots 132, 134 as these pivots are stationary and/or moving.

As the hinge 120 moves, the distance 16 between the first pivot 126 of the first link 122 and the first pivot 128 of the second link 124 may change. As shown in FIG. 3-2, the distance 16 is at its greatest as the first link 122 and the second link 124 are offset by 180 degrees about the hinge pivot 130. As shown in FIG. 2-2, the angle (e.g., angle $\theta_2$ in FIG. 1-2) between the first portion 102 and the second portion 104 is less than 180 degrees. The relationship between the angle of the hinge 120 and the first and second portions 102, 104 may be predetermined by the position of the first and/or second springs 136, 138. For example, as shown in FIGS. 1-2 and 2-2, when the angle between the first link 122 and the second link 124 is 180 degrees, the angle between the first portion 102 and the second portion 104 may be 135 degrees.

Figure 4:
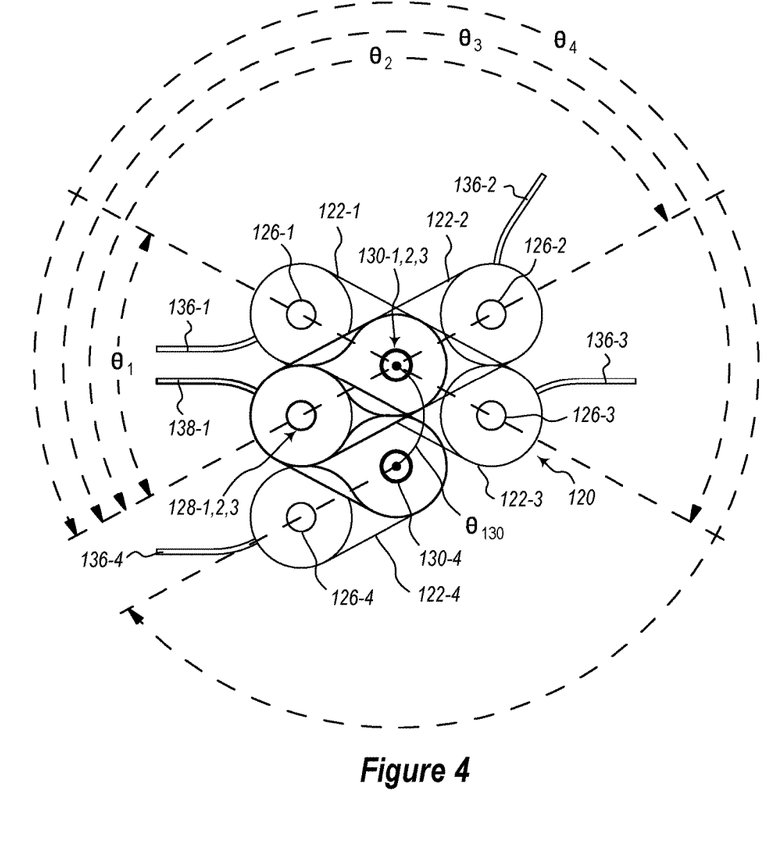
FIG. 4 is an illustration of the embodiment of a hinge of FIG. 1-1 as it transitions from the closed configuration to the open configuration to the flat configuration and to the inverted configuration.

The first portion 102 may be selectively positionable relative to the second portion 104. In other words, when a user transitions the computing device 100 from the closed configuration to an open configuration, the computing device 100 may remain where the user positioned the computing device 100. For example, if the user moved the first portion 102 to an angle of 135 degrees, the computing device 100 may remain within one degree of the 135-degree position. This may be accomplished, for example, by the use of a friction hinge as shown in FIG. 4. The friction hinge 170 may be selected to balance the biasing forces applied by the first and/or second links 122, 124. For example, the friction hinge 170 and the first and/or second springs 136, 138 may be selected such that the computing device 100 may remain at any selected position between the closed configuration through the open configuration to the flat configuration. In at least one embodiment, the friction hinge 130 may have a lower torque than the torque provided by first and second springs 136, 138 so as to keep the hinge 120. This may keep the hinge 120 stationary from 0 to 180 degrees. In some embodiments, the torque for friction hinge 130 may be sufficiently high to maintain a given orientation of the computing device 100 while accounting for the worst case weight and/or orientation of the computing device 100. In other words the torque for friction hinge 130 may be bound between these two requirements, in some embodiments.

Figure 24:
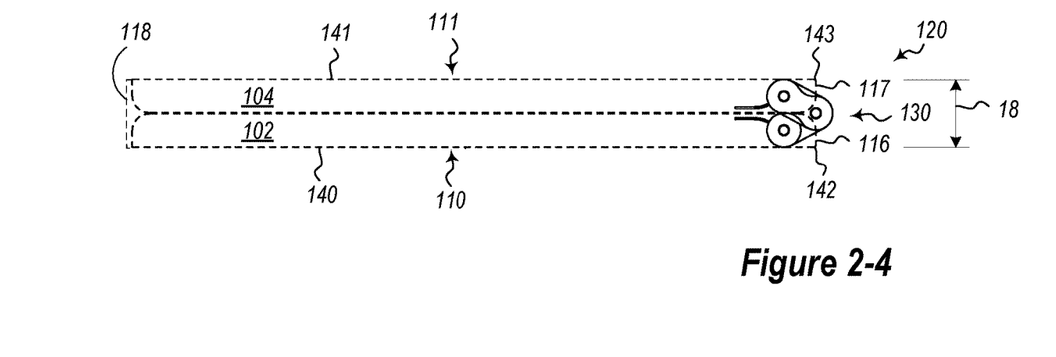

Once the hinge 120 transitions beyond the flat configuration, the biasing forces of the first and/or second springs 136, 138 may overcome the friction hinge 170, thus requiring a latch (e.g., latch 118 in FIG. 2-4) or other retention mechanism.

Referring briefly to FIG. 4, FIG. 4 is an illustration of the embodiment of a hinge 120 of FIGS. 2-1 through 2-4 as it transitions from the closed configuration to the open configuration to the flat configuration and to the inverted configuration. The hinge 120 is shown in each configuration but with the first pivot 128 of the second link (e.g., second link 124) fixed. Thus, for ease of description, the first pivot 126 is labeled differently at each of the locations through the transitions. For example, first pivot 126-1 is used to show the location of the first pivot in the closed configuration of FIGS. 1-1, 2-1, 3-1, first pivot 126-2 is used to show the location of the first pivot in the open configuration of FIGS. 1-2, 2-2, 3-2, the first pivot 126-3 is used to show the location of the first pivot in the flat configuration of FIGS. 1-3, 2-3, 3-3, and the first pivot 126-4 is used to show the location of the first pivot in the inverted configuration of FIGS. 1-4, 2-4, 3-4. Likewise, the hinge pivot (e.g., hinge pivot 130) is shown as hinge pivot 130-1, 2, 3 in the closed, open, and flat configurations and hinge pivot 130-4 in the inverted configuration.

The first link 122 and the second link 124 form a first angle θ1 in the closed configuration. In other words, a first line through the first pivot 126 and second pivot 132 of the first link 122 and a second line through the first pivot 128 and the second pivot 134 of the second link 124 form the first angle $\theta_1$. The first link 122 and the second link 124 form a second angle $\theta_2$ in the open configuration of FIGS. 1-2, 2-2, 3-2, a third angle $\theta_3$ in the flat configuration of FIGS. 1-3, 2-3, 3-3, and a fourth angle $\theta_4$ in the inverted configuration of FIGS. 1-4, 2-4, 3-4.

As can be seen from FIG. 4, the hinge pivot 130-1, 2, 3 does not move until the hinge 120 transitions from the flat configuration toward the inverted configuration, but then the hinge pivot 130-4 moves about an arc $\theta_{130}$ from the flat configuration to the inverted configuration. Maintaining the hinge pivot 130-1, 2, 3 in the same location from the closed configuration to the flat configuration prevents the edges 142, 143 from impacting each other. Thus, in at least one embodiment, the hinge pivot 130 remains substantially stationary (e.g., the second link 124 does not rotate more than one degree while the hinge 120 transitions to the flat configuration). In other embodiments, the second link 124 may not rotate more than ten degrees. In some embodiments, the second link 124 may not rotate more than between zero and ten degrees, between zero and five degrees, between zero and one degree, or any ranges or values therebetween. As the hinge 120 transitions from the flat configuration to the inverted configuration the first link pivots about its first pivot 126 and the second link pivots about the hinge pivot 130.

This can be seen more clearly in FIG. 2-2, where the first edge 142 of the first inner surface (e.g., cover glass 140) of the first portion 102 is spaced apart from the second edge 143 of the second inner surface (e.g., cover glass 141) of the second portion 104 by a gap 18. The gap 18 may be maintained as the hinge 120 transitions from the closed configuration to the flat configuration. For example, as the hinge 120 transitions to the flat configuration of FIG. 2-3, the first link 122 remains substantially stationary, as best seen in FIG. 4. The gap 18 may range from 1 mm to 5 mm. In some embodiments, the gap 18 may be smaller than the combined length of the first link 122 and the second link 124 (e.g., the sum of the first distance 12 and the second distance 14 as seen in FIGS. 3-1 through 3-4).

Referring back to FIG. 2-3, the outer surface 116 of the first portion 102 and the outer surface 117 of the second portion 104 may abut in the flat configuration. As the hinge 120 transitions from the flat configuration toward the inverted configuration of FIGS. 1-4, 2-4, 3-4, the outer surfaces 116, 117 may abut and may overcome the biasing forces of the first spring 136 and/or the second spring 138 such that the second link 124 may rotate against a biasing force about the first pivot 128 of the second link 124. This rotation of the second link 124 may move the hinge pivot 130 as best seen in FIG. 4. The hinge pivot 130 may move about the arc $\theta_{130}$ toward the inverted configuration.

As shown in FIG. 2-4, the inner surfaces of the first and second portions 102, 104 may be facing away from each other. This inverted configuration may allow a user to access the input device 111 and/or the display 110.

In embodiments where the computing device 100 is biased toward the closed configuration (e.g., where the first link 122 is biased about the first pivot 126 in a clockwise direction and/or the second link 124 is biased about the first pivot 128 in a counterclockwise direction), a latch 118 shown in FIG. 2-4 may be used to retain the computing device 100 in the inverted configuration. In other embodiments, other retention mechanisms may be used. For example, the hinge 120 may include a ratcheting mechanism, a detent, one or more magnets, other retention mechanisms, or combinations thereof may be used.

FIG. 5 is an isometric view of the embodiment of a hinge 120 of FIG. 1-1 showing an electrical wire 150 in a guide 160. In some embodiments, the hinge 120 may include a guide 160 to direct an electrical wire 150 through the hinge 120. As shown in FIG. 5, the guide 160 may extend from a first opening 162 to a second opening 164. The first opening 162 may extend parallel to the axis of the first pivot 126 of the first link 122. The second opening 164 may extend parallel to the axis of the first pivot 128 of the second link 124. The guide 160 may extend parallel to the axis of the second pivots 132, 134 of the first and second links 122, 124, respectively. Locating a portion of the guide 160 parallel to the axis of the first pivot 126 of the first link 122 and/or the first pivot 128 of the second link 124 and/or the second pivots 132, 134 of the first and second links 122, 124 may allow an electrical wire 150 to move within the guide 160 without being pinched and/or otherwise damaged.

In another example, the guide 160 may be configured such that the electrical wires 150 pass through the axes of the pivots 124, 126, 132, 134. This guide configuration may ensure that the electrical wire 150 are always passing through the neutral axes of the hinge 120. This configuration may provide the benefit that tension and/or compression are not placed on the electrical wire 150. Hence, in some embodiments, a service loop may not be required as the electrical wire 150 is not forced to shrink or grow as the hinge 120 is articulated through its range of motion As shown in FIG. 5, the guide 160 may be formed by the first and second links 122, 124 and by a first guide cover 166 and a second guide cover 168. In other embodiments, the guide 160 may be integrally formed within the first and second links 122, 124.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A hinge, comprising a first portion; a second portion; a first link having a first pivot and a second pivot, the first pivot connected to the first portion, the first link biased about the first pivot of the first link toward a first position; a first spring connected to the first pivot of the first link; a second link having a first pivot and a second pivot, the first pivot of the second link connected to the second portion, the second pivot of the second link connected to the second pivot of the first link, the second link biased about the first pivot of the second link toward the first position, the second pivot of the first link and the second pivot of the second link defining a hinge pivot; and a second spring connected to the first pivot of the second link.

2. The hinge of claim 1, wherein a first distance between the first pivot and the second pivot of the first link and a second distance between the first pivot and the second pivot of the second link are the same.

3. The hinge of claim 1, further comprising a friction connection between the second pivot of the second link and the second pivot of the first link.

4. The hinge of claim 1, wherein the first link and the second link are configured to transition from the first position toward a second position.

5. The hinge of claim 4, wherein a first angle between the first link and the second link in the first position and a second angle between the first link and the second link in the second position is the same.

6. The hinge of claim 1, wherein the hinge pivot is in a first location in the first position and a second location in the second position, the first location and the second location being different.

7. The hinge of claim 6, wherein the hinge pivot remains in the first location as the hinge moves from the first position toward a flat position.

8. The hinge of claim 6, wherein the hinge pivot moves about an arc from the first location toward the second location as the hinge moves from the first position toward the second position.

9. The hinge of claim 8, wherein the arc about which the hinge pivot moves is the same as a first angle between the first link and the second link in the first position or a second angle between the first link and the second link in the second position.

10. A computing device, comprising a first portion having a first inner surface and a first outer surface; a second portion having a second inner surface and a second outer surface; and a hinge including: a first link having a first pivot and a second pivot, the first pivot connected to the first portion, the first link biased about the first pivot of the first link toward a first position; a first spring connected to the first pivot of the first link; a second link having a first pivot and a second pivot, the first pivot of the second link connected to the second portion, the second pivot of the second link connected to the second pivot of the first link, the second link biased about the first pivot of the second link toward the first position, the second pivot of the first link and the second pivot of the second link defining a hinge pivot; and a second spring connected to the first pivot of the second link.

11. The computing device of claim 10, wherein the first link and the second link are configured to transition from the first position toward a second position.

12. The computing device of claim 11, wherein the first portion includes a first cover glass and the second portion includes a second cover glass.

13. The computing device of claim 12, wherein a first edge of the first cover glass of the first portion extends to at least one edge of the first portion of the computing device and wherein a second edge of the second cover glass of the second portion extends to at least one edge of the second portion of the computing device.

14. The computing device of claim 13, wherein the computing device is configured such that the first edge of the first cover glass does not contact the second edge of the second cover glass as the first link and the second link transition from the first position toward a second position.

15. The computing device of claim 14, wherein the first inner surface of the first portion is adjacent the second inner surface of the second portion in the first position.

16. The computing device of claim 15, wherein the first inner surface of the first portion abuts the second inner surface of the second portion in the first position.

17. The computing device of claim 16, wherein the first outer surface of the first portion is adjacent the second outer surface of the second portion in the second position.

18. A method for transitioning a computing device to a flat configuration, comprising: moving a first portion of a computing device from a closed configuration where a first inner surface of the first portion adjacent a second inner surface of a second portion of the computing device to an open configuration where the first inner surface of the first portion does not abut the second inner surface of the second portion, the computing device comprising: the first portion having the first inner surface and a first outer surface; the second portion having the second inner surface and a second outer surface; and a hinge including: a first link having a first pivot and a second pivot, the first pivot connected to the first portion, the first link biased about the first pivot of the first link toward a first position; a first spring connected to the first pivot of the first link; a second link having a first pivot and a second pivot, the first pivot of the second link connected to the second portion, the second pivot of the second link connected to the second pivot of the first link, the second link biased about the first pivot of the second link toward the first position, the second pivot of the first link and the second pivot of the second link defining a hinge pivot; a second spring connected to the first pivot of the second link; and moving the first portion of the computing device to a flat configuration where the first inner surface of the first portion is parallel to the second inner surface of the second portion.

* * * * *